United States Patent
Klein (10) Patent No.: US 11,492,191 B2
(45) Date of Patent: Nov. 8, 2022

(54) SALAD DRESSING PREPARATION AND STORAGE DEVICES

(71) Applicant: Bonnie Stepleton, Sandia Park, NM (US)

(72) Inventor: Arnold Gregory Klein, Sandia Park, NM (US)

(*) Notice: Subject to any disclaimer, the term of this patent is extended or adjusted under 35 U.S.C. 154(b) by 569 days.

(21) Appl. No.: 14/999,783

(22) Filed: Jun. 27, 2016

(65) Prior Publication Data
US 2021/0309439 A1 Oct. 7, 2021

(51) Int. Cl.
| | | |
|---|---|---|
| *B65D 25/04* | (2006.01) | |
| *B65D 43/02* | (2006.01) | |
| *B65D 47/12* | (2006.01) | |
| *B65D 53/04* | (2006.01) | |
| *B65D 81/32* | (2006.01) | |
| *A23L 27/60* | (2016.01) | |
| *A47J 43/27* | (2006.01) | |

(52) U.S. Cl.
CPC .......... B65D 81/3283 (2013.01); *A23L 27/60* (2016.08); *A47J 43/27* (2013.01); *B65D 25/04* (2013.01); *B65D 43/0231* (2013.01); *B65D 47/127* (2013.01); *B65D 53/04* (2013.01); *A23V 2002/00* (2013.01)

(58) Field of Classification Search
CPC .......... B65D 1/02; B65D 1/0223; B65D 1/04; B65D 25/04; B65D 43/0231; B65D 47/127; B65D 53/04; B65D 81/3283
USPC ............. 215/6; 220/525, 553, 555; 426/519; 99/316, 495, 496, 516, 534
See application file for complete search history.

(56) References Cited

U.S. PATENT DOCUMENTS

| | | | | | |
|---|---|---|---|---|---|
| 2,731,013 | A * | 1/1956 | Holmes | .............. | B65D 81/3283 604/416 |
| 4,148,417 | A * | 4/1979 | Simmons | ............... | B65D 35/22 222/215 |
| 5,232,108 | A * | 8/1993 | Nakamura | ............... | B65D 1/04 425/525 |
| 5,332,112 | A * | 7/1994 | Blocker | ................. | B65D 51/18 215/230 |
| 5,588,550 | A * | 12/1996 | Meyer | .................. | B65D 47/265 220/253 |
| 5,588,561 | A * | 12/1996 | Ness | ....................... | A47G 19/02 206/217 |

(Continued)

FOREIGN PATENT DOCUMENTS

| | | | | |
|---|---|---|---|---|
| FR | 2800463 A1 * | 5/2001 | ............. | G01F 19/00 |
| WO | WO00711478 * | 11/2000 | ............. | A47G 21/18 |

*Primary Examiner* — Joshua E Rodden
(74) *Attorney, Agent, or Firm* — Kameron W. Kramer (57) ABSTRACT

The Improved Salad Dressing Preparation and Storage Container is a food preparation device that allows for conveniently measuring, mixing, and dispensing of homemade vinaigrette salad dressing. The device uses two adjacent, adjoined compartments that are volumetrically proportioned to allow for the recommended ratio of oil and vinegar (acid) to be consistently achieved by filling them with oil and vinegar to the same apparent level. The Improved Salad Dressing Preparation and Storage Container may also be configured for commercial sale pre-filled with the oil and vinegar contents, those kept separated by sealing the adjoined compartments using an adapted seal. The pre-filled container may be designed and marketed for secondary use by consumers for use in making their own vinaigrette salad dressing recipes.

4 Claims, 8 Drawing Sheets

(56) References Cited

U.S. PATENT DOCUMENTS

| | | | | |
|---|---|---|---|---|
| 5,765,725 A * | 6/1998 | Matt | ............... | B65D 35/22 |
| | | | | 222/129 |
| 5,794,819 A * | 8/1998 | Smith | ............... | B65D 47/30 |
| | | | | 222/129 |
| 5,921,440 A * | 7/1999 | Maines | ............ | B65D 81/3288 |
| | | | | 222/145.2 |
| 6,450,351 B1 * | 9/2002 | Thompson | ............ | B65D 51/20 |
| | | | | 220/524 |
| 8,777,044 B1 * | 7/2014 | Raymus | ............ | B65D 81/3205 |
| | | | | 222/129 |
| D829,567 S * | 10/2018 | Ayala Figueredo | ........... | D9/741 |
| 10,562,693 B1 * | 2/2020 | Ambrezewicz | .... | B65D 47/0838 |
| 11,001,434 B1 * | 5/2021 | Jordan | .................. | A47J 47/02 |
| 2008/0121654 A1 * | 5/2008 | Pikowski | ............ | A47G 19/183 |
| | | | | 222/129 |
| 2008/0277310 A1 * | 11/2008 | Chacon | ............. | B65D 81/3283 |
| | | | | 206/568 |
| 2011/0272302 A1 * | 11/2011 | Pagan | ................ | B65D 81/3283 |
| | | | | 206/219 |
| 2015/0050405 A1 * | 2/2015 | Trager | ..................... | C12G 3/04 |
| | | | | 426/519 |
| 2015/0158632 A1 * | 6/2015 | Wilhelm | ............... | B65D 47/263 |
| | | | | 426/120 |
| 2016/0066749 A1 * | 3/2016 | Trager | ................... | B65D 25/08 |
| | | | | 206/222 |
| 2016/0166116 A1 * | 6/2016 | Kish | ....................... | A47J 47/02 |
| | | | | 220/523 |
| 2017/0296000 A1 * | 10/2017 | Shalvi | ................... | G05D 11/03 |
| 2017/0334607 A1 * | 11/2017 | Olvera | ................... | B65D 55/16 |
| 2018/0065771 A1 * | 3/2018 | Solowiej | ................ | B65D 1/04 |
| 2018/0353922 A1 * | 12/2018 | Pappas | .............. | B01F 33/50111 |
| 2020/0060931 A1 * | 2/2020 | Carrico | ................. | B65D 25/04 |
| 2020/0385193 A1 * | 12/2020 | Joseph | .............. | B65D 81/3222 |
| 2021/0031963 A1 * | 2/2021 | Bugariu | ................. | B65D 1/04 |
| 2021/0139223 A1 * | 5/2021 | Aceves | .................. | B65D 25/04 |
| 2021/0188614 A1 * | 6/2021 | LaBarbera | ............... | A47J 43/27 |

* cited by examiner

SALAD DRESSING PREPARATION AND STORAGE DEVICES

Applicant claims the benefit of provisional application Ser. No. 62/391,310 filed Apr. 27, 2016.

FIELD OF THE INVENTION

The present invention relates to a proportionally divided container for preparing, dispensing, and storing vinaigrette type salad dressing.

BACKGROUND OF THE INVENTION

Gourmet home cooking has become extremely popular and is more accessible to everyone than ever. Of course, this has resulted in an increasing popularity of cooking shows and the explosion of recipe books and specialty cooking products all widely available on the internet and in retail stores. No longer satisfied to buy prepared food, many consumers are opting to prepare fresh food, one meal at a time.

At the present time, there are a multitude of commercial products available for the preparation and storage of oil and vinegar (vinaigrette) salad dressings. Most of these widely available products are decorative containers or cruets that are not specifically adapted for making oil and vinegar (vinaigrette) dressing. These non-adapted containers leave it up to the consumer to determine the correct oil and vinegar (or other acid) ratio for their dressing.

There are some salad dressing containers or bottles that are more specifically adapted and may include fill lines designated for the preferred ratio of oil and vinegar (3 parts oil to 1 part vinegar) for preparing vinaigrette salad dressing. As far as they go, these products have adequate utility except that using the fill lines requires that an entire bottle of dressing be prepared. This is not always desirable as when only a single, double or small serving is required or when the dressing is to be used as a condiment to flavor a sandwich or other foods.

At this time there is a rapidly growing number of specialty stores opening up that are offering unique and different varieties of high end olive and other edible oils. There are a growing number of consumers who are coming to appreciate these specialty, gourmet oils and also higher end (balsamic) vinegars. Of course, with the variety and gourmet quality of these oils and balsamic vinegars comes a premium price. Standard olive oils are expensive enough, but these gourmet oils and vinegars make it increasingly necessary for consumers to use them in the most economical manner. Since many consumers will be making vinaigrette salad dressings with these oils and may not know the recommended (by culinary professionals) oil to vinegar ratio, they will often be forced to prepare too much. Worse still, since they may not know the correct oil to vinegar ratio or recipe, they could be dissatisfied with the taste of their dressing. This problem is made even a bit more complex where lemon juice is substituted for or added in addition to the vinegar. Most vinaigrette recipes that call for lemon juice will specify the juice of a half or whole lemon, but the actual volume of lemon juice that results is not typically consistent. This volume inconsistency can result in a less than optimal culinary result.

SUMMARY OF THE INVENTION

The instant invention is a simple, divided container that makes it very convenient to prepare just the desired amount of vinaigrette dressing with the correct oil to vinegar ratio. This device uses two volumetrically proportioned, adjoined compartments that set the oil and vinegar ratio to the recommended 3 to 1 volumetric ratio when they are filled to approximately the same level. The Improved Salad Dressing Preparation and Storage Devices can be configured for making a single serving of vinaigrette or all the way up to a container to prepare multiple servings. The patent also discloses invention embodiments specifically configured to be sold pre-filled with the oil and vinegar contents. These products make it possible for commercial chefs or dieticians to optimize the vinaigrette dressing by the informed specification of the oil and vinegar contents. Further, this package configuration allows for the dressing enhancing spices or other ingredients to be on the oil side of the container where they will not be degraded by the acidity of the vinegar. Since typically, the pre-filled dressing container has space between the compartments sealing means and the container lid, there is the option to put the additional ingredients in a foil pack, sample cup or other small package adapted for this space. The pre-filled container may be made disposable or designed for reuse for consumers to make their own recipe oil and vinegar dressing.

The problem that the instant invention seeks to solve is that of consumers having to make more vinaigrette dressing than they need or want and further to eliminate preparation errors where their result may deviate substantially from the widely recommended vinaigrette dressing recipe of 3 parts of oil to 1 part of vinegar.

BRIEF DESCRIPTION OF THE DRAWINGS

The patent figures are intended to demonstrate some, but necessarily all of the design configurations for the IMPROVED SALAD DRESSING PREPARATION AND STORAGE CONTAINERS may have. These figures are not intended to show all of the potential device embodiments, but rather to demonstrate the design versatility of the instant invention.

DETAILED DESCRIPTION OF THE INVENTION

Figure 1:
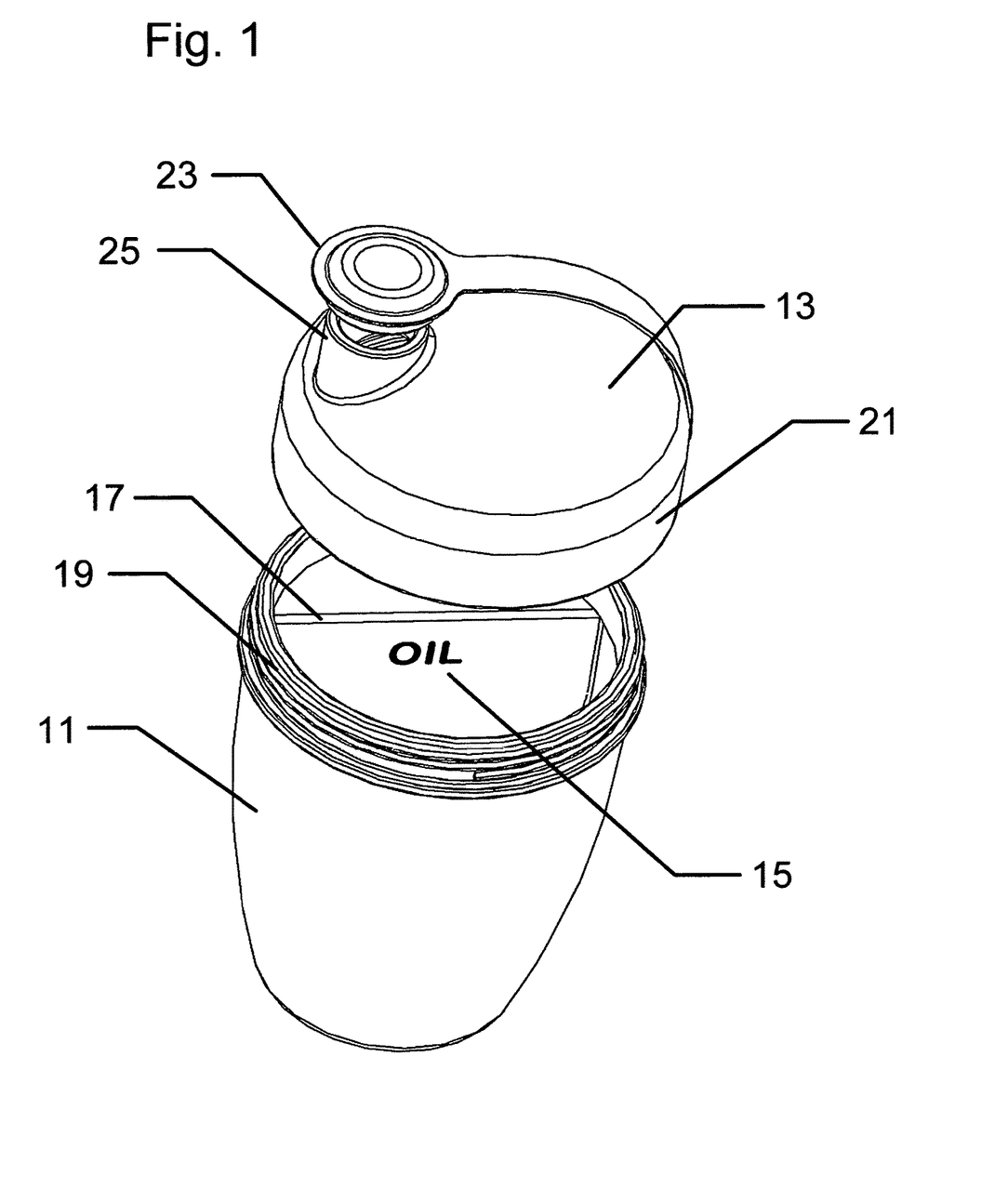
FIG. 1 depicts an oblique view of the salad dressing preparation device with a fixed divider and lid.
Figure 2:
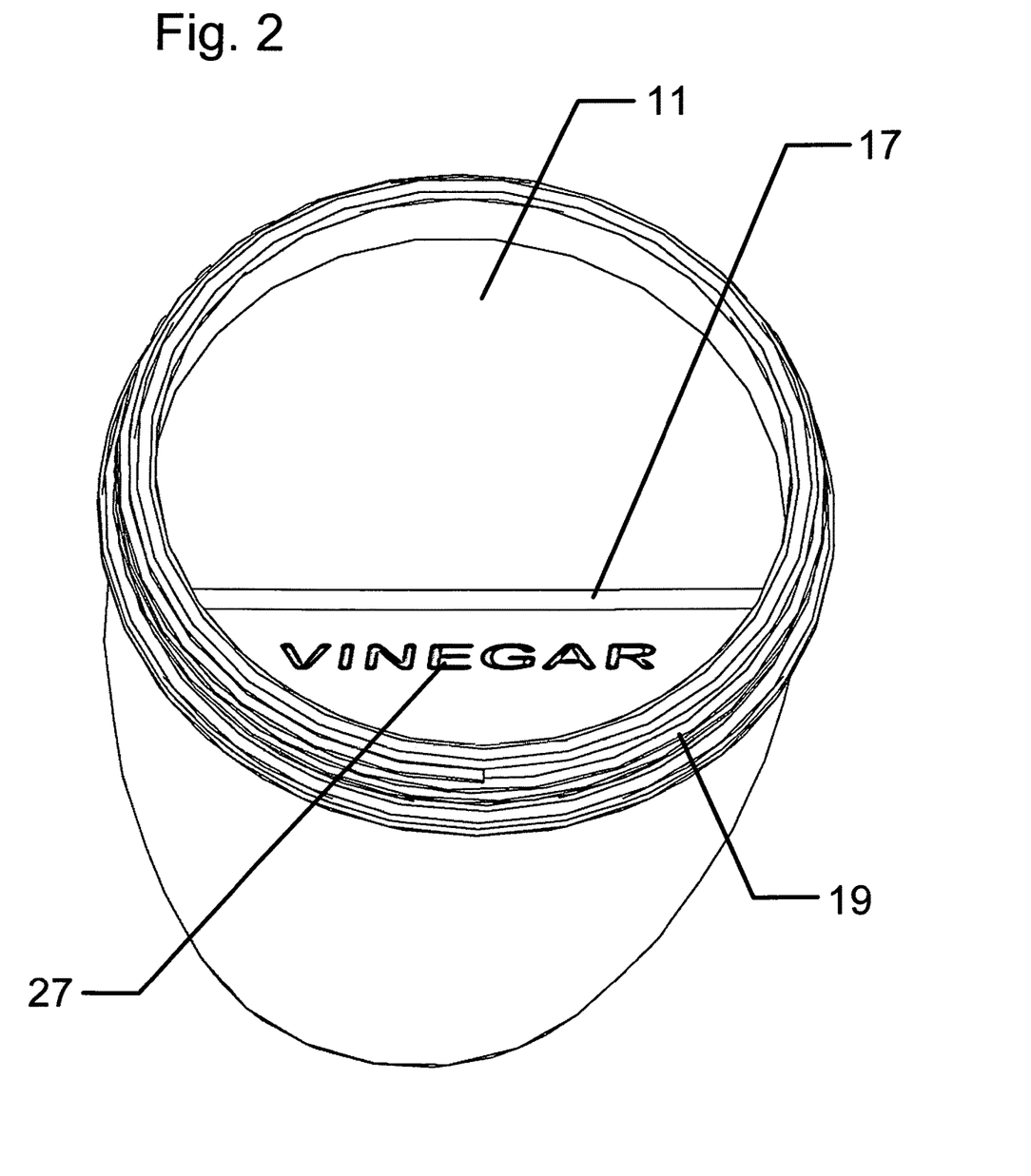
FIG. 2 depicts an oblique view of the divided container of the salad dressing preparation device with the "vinegar" compartment designation.

Referring to the FIGS. 1 and 2 there is shown a divided container 11 with adapted lid 13 designed for a threaded 19 and 21 leak proof fit. The container 11 is shown with a fixed divider 17 that serves to divide the container into two adjacent, adjoined compartments wherein the compartment identified for "OIL" at 15 is three (3) times greater in volume than the adjacent compartment identified for "VINEGAR" as shown in FIG. 2 at 27. In the process for using this dressing preparation container, you simply fill the oil compartment to any desired level and then add the vinegar to approximately the same level as the oil. Filling the oil and vinegar compartments to the same approximate level will result in the correct vinaigrette recipe. The container may include level markings or designations to indicate the total fluid volume or servings of dressing. Once the container 11 compartments are filled, and the lid 13 and container 11 and the stopper 23 and top opening 25 are securely closed, the dressing can be mixed by shaking. Of course, if any additional ingredients are to be included in the dressing they can be added before the shake mixing. The vinaigrette dressing is poured from the lid opening 25 when dispensed. The dressing container 11 with lid 13 and stopper 23 are adapted for secure, refrigerated storage.

Figure 3:
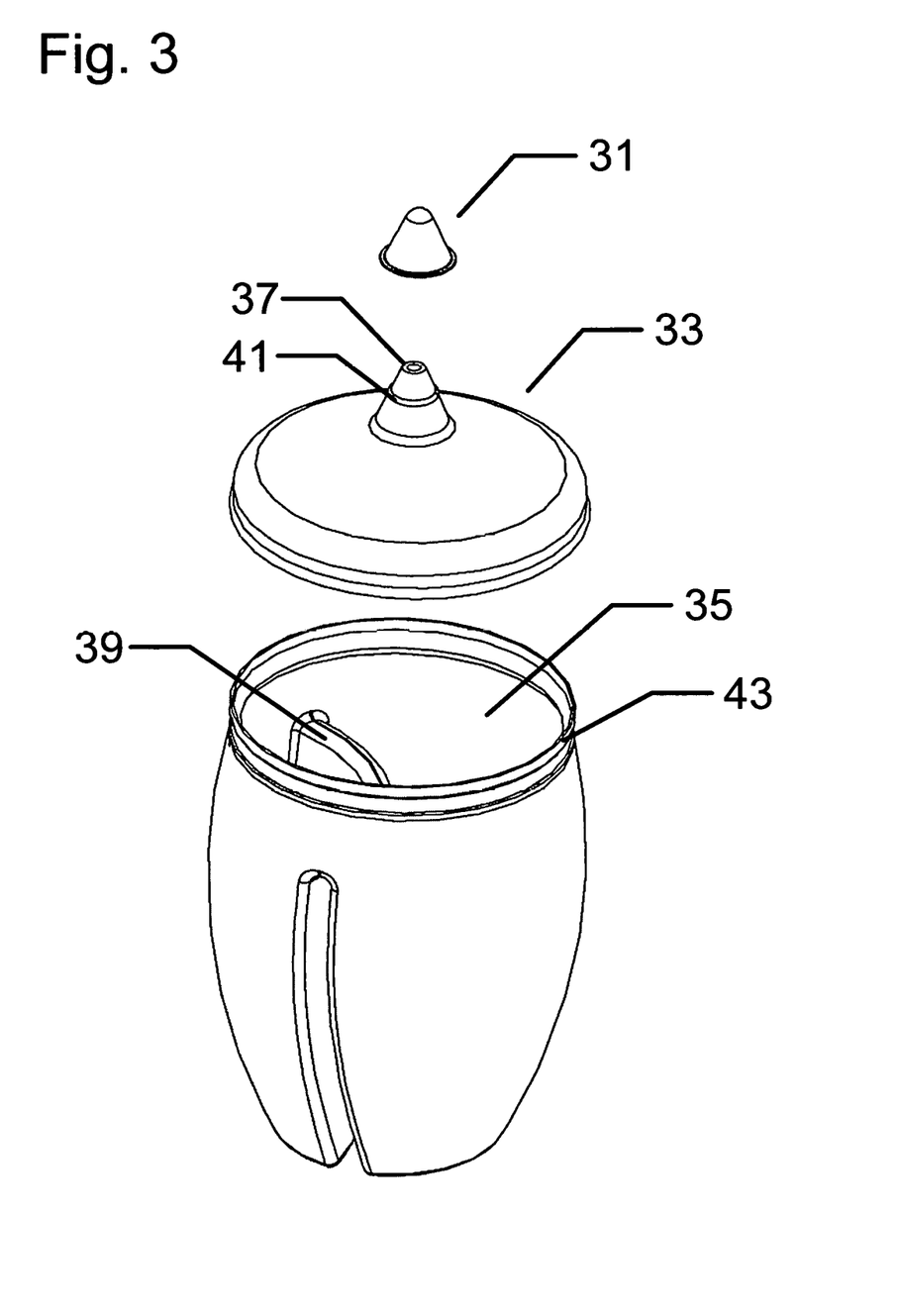
FIG. 3 depicts an oblique view of an alternate configuration of the salad dressing preparation and storage device.
Figure 4:
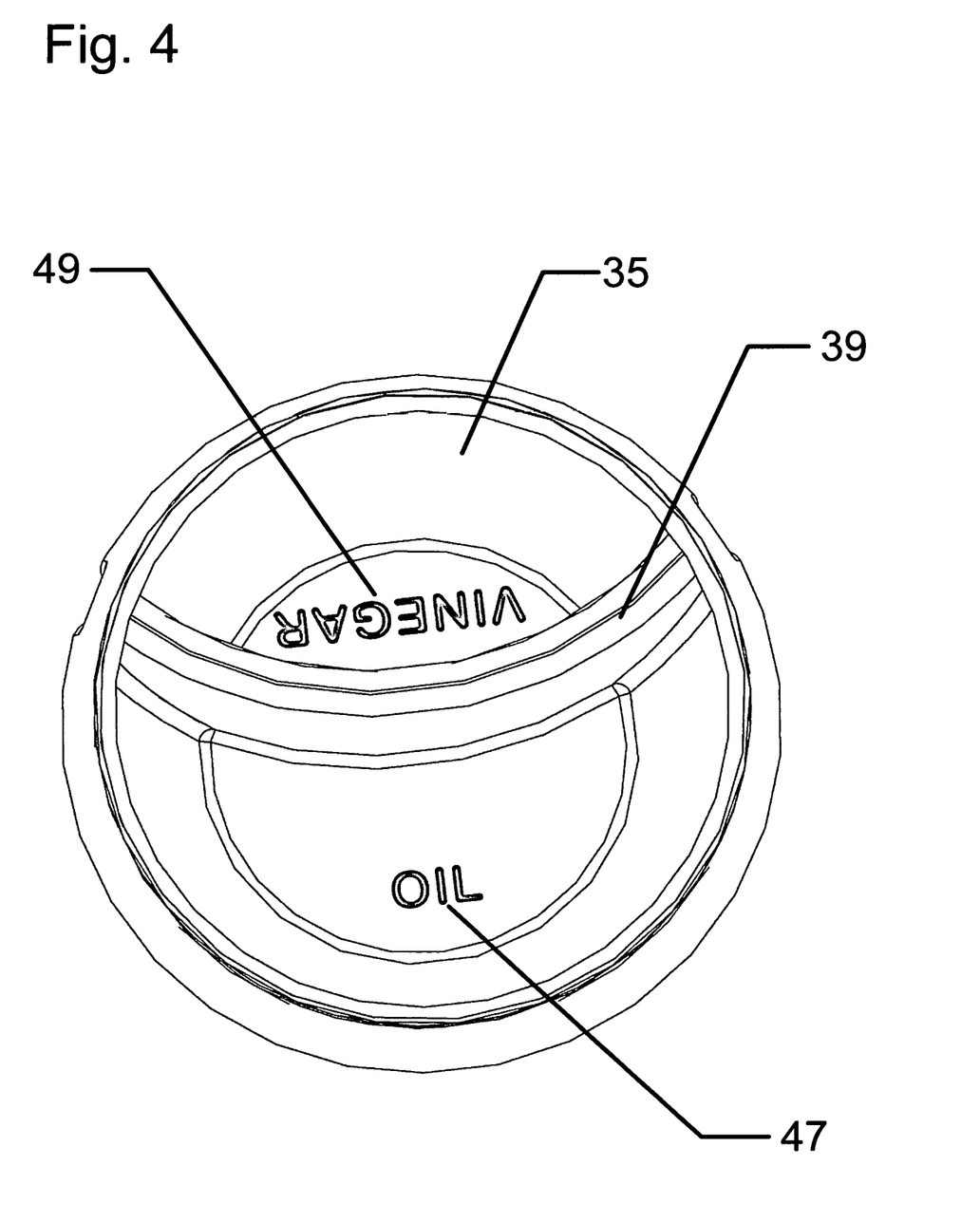
FIG. 4 depicts a top view of the device of FIG. 3.

Referring to the FIGS. 3 and 4 there is shown a divided container 35 with divider 39 adapted for making vinaigrette dressing. The lid 33 can be snap fit over the container flange shown at 43. This embodiment has a dressing dispensing nozzle with small opening at 37 wherein a cap 31 is adapted to fit over a raised sealing bead at 41. The FIG. 4 shows the container 35 adjoining compartments with designation for "OIL" at 47 and "VINEGAR" at 49. The process for using this dressing preparation container is equivalent to the device of FIGS. 1 and 2. There may be some consumers who prefer their dressing with a ratio that is slightly different than the widely recommended 3 parts oil to 1 part vinegar. There is nothing that prevents them from customizing the fill levels of the respective divided container compartments and their "customized" ratio will be easier to achieve when the container levels can so easily be visually compared. This snap fitted lid with dispensing spout is well suited to be used as a single, or double serving device for use with packed lunches. This container may be made from a "soft" food grade polymer to be squeezed for dispensing the dressing.

Figure 5:
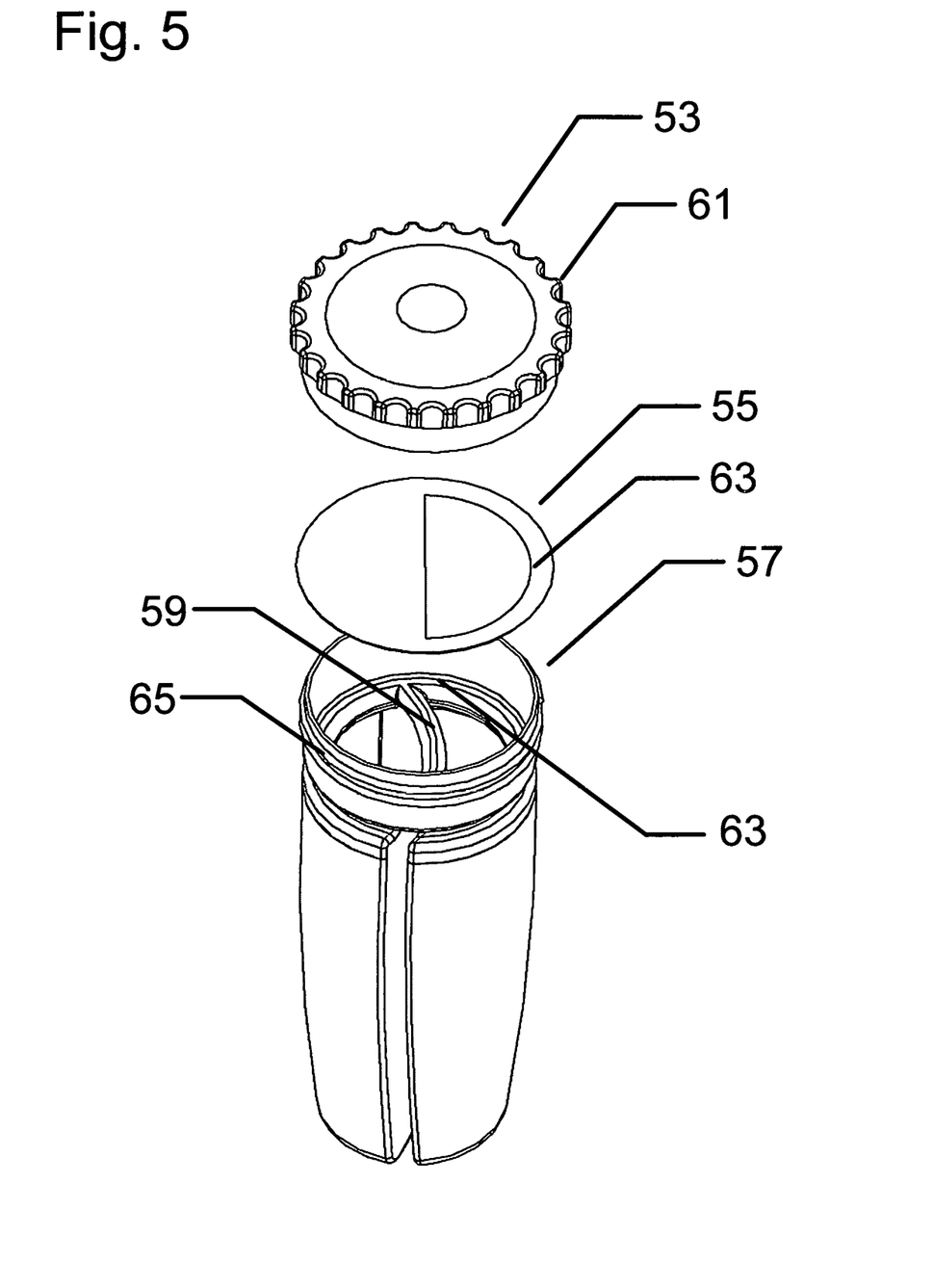
FIG. 5 depicts an oblique view of the salad dressing preparation device configured to be supplied with compartments pre-filled with oil and vinegar.
Figure 6:
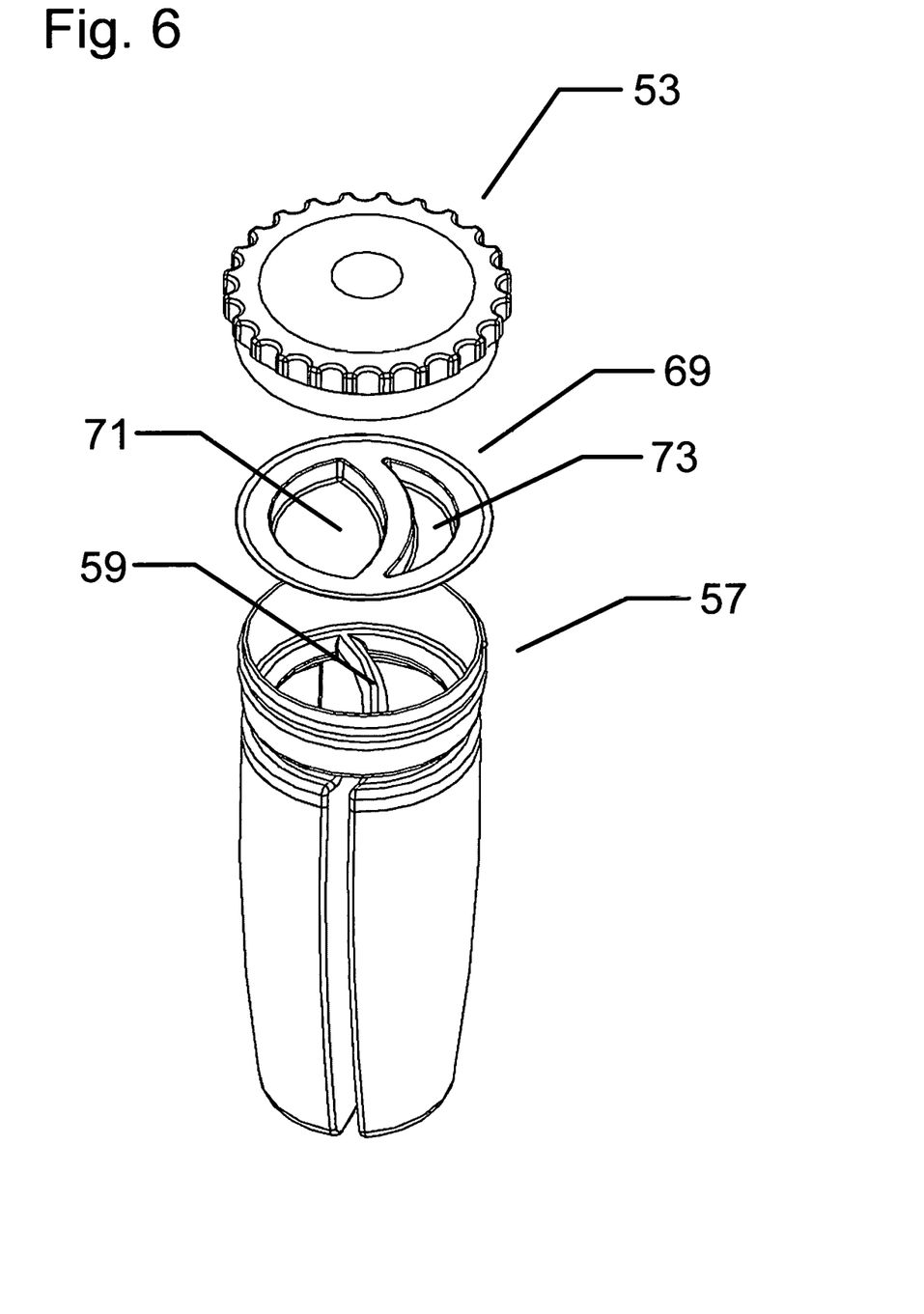
FIG. 6 depicts an oblique view of an alternate configuration of the salad dressing preparation device configured to be supplied with compartments pre-filled with oil and vinegar.

Referring to FIGS. 5 and 6 there is shown a divided container 57 with integrally formed divider 59 that serves to divide the container into two adjacent compartments wherein the compartment designated for oil is three (3) times greater in volume than the adjacent compartment designated for vinegar. The divided container 57 has threads at 65 adapted to mate with threads formed in the fluted 61 container lid 53. This vinaigrette container is designed to be sold pre-filled with oil and vinegar. The oil and vinegar contents are kept separated by the use of a poly-foil or plastic coated paper sealing insert 55 that is heat sealed to the container divider 59 and internal land 63. Once the sealing insert 55 is removed by the consumer using the pull-tab 63, the lid is placed on the container and the oil and vinegar contents can be mixed by shaking. A salad dressing container of this configuration allows for the packaging and retail display of oil and vinegar contents that may be matched by professional chefs to optimize the resulting vinaigrette recipe. Further, this divided compartment configuration allows for any additional dressing ingredients to be added to the oil compartment. This prevents the acidic breakdown that can occur when these ingredients are added to a vinaigrette formulation wherein all the ingredients are sitting intermixed on the store shelf Additionally, there is a space in the container between the lid 53 and the sealing insert 55 to hold a small, sealed package of spices, fresh herbs, feta or other ingredients to flavor the vinaigrette salad dressing. Ideally, the salad dressing container that is configured to be sold pre-filled can be designed to be reuse by the consumer to prepare and store their own vinaigrette dressings. As shown in FIG. 6 the contents of the salad dressing container 57 compartments may be separated by a flexible closure 69 with form fitting plugs 71 and 73 adapted to seal the compartments.

Figure 7:
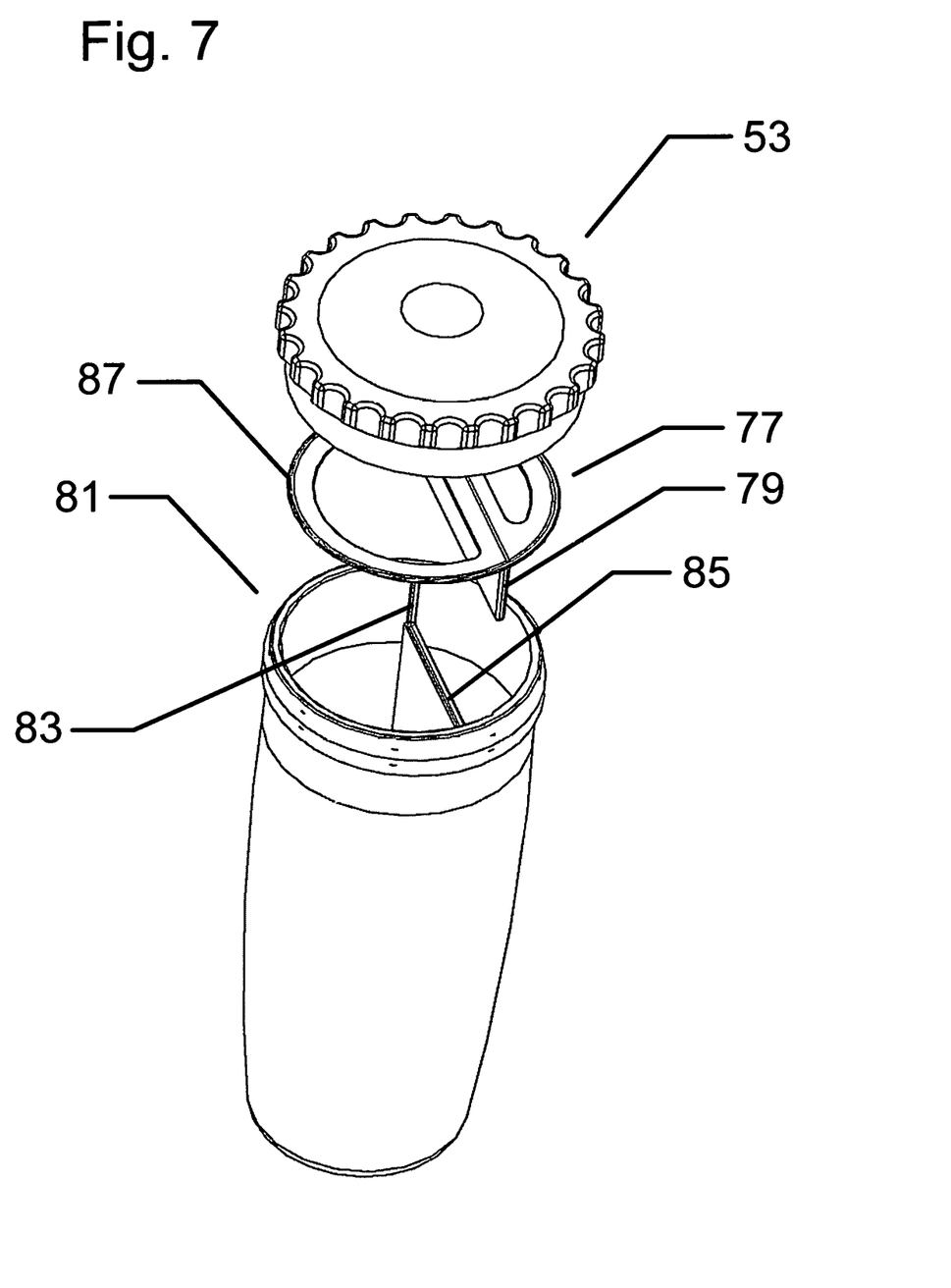
FIG. 7 depicts an oblique view of another alternate configuration of the salad dressing preparation device configured to be supplied with compartments pre-filled with oil and vinegar.
Figure 8:
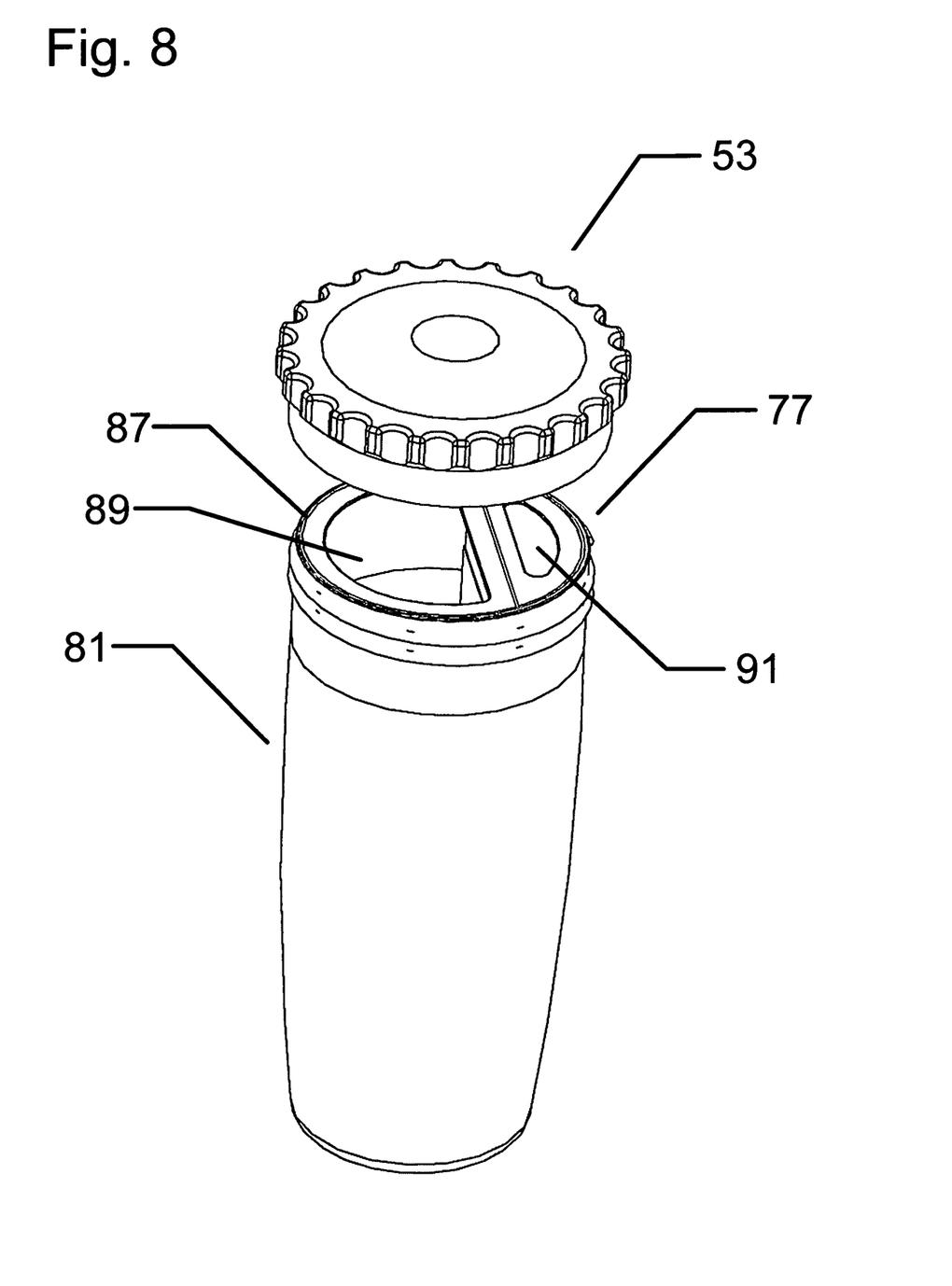
FIG. 8 depicts the device of FIG. 7 with the sealing divider seated on the top of the device container.

Referring to the FIGS. 7 and 8 there is shown divided container 81 with integrally formed divider 85 that serves to divide the container into two adjacent compartments wherein the compartment designated for oil is (3) times greater in volume than the adjacent compartment designated for vinegar. The divided container 81 has threads adapted to mate with threads formed in the container lid 53. This salad dressing container 81 is adapted to be filled with oil and vinegar contents that are separated by the fixed divider 85 and the re-moveable divider 79 formed integrally with the sealing panel 77. As seen in FIG. 8 the sealing panel 77 and divider 79 are friction fitted with the container groove 83 and sealing bead 87 to seal the container and keep the oil and vinegar contents separated. This configuration of the salad dressing container allows for an almost complete filling of the oil and vinegar compartments through the access openings 89 and 91. This container is not completely filled as this would not leave sufficient head space for shake mixing.

It should be noted that the vinegars can be supplied diluted or concentrated, leaving some latitude for competitors to work around to the 3 parts oil to 1 part vinegar (or acid) ratio. This is likely to result in rendering this pre-filled container useless for secondary use by the consumer.

I have now described my invention in considerable detail, however others skilled in the art can devise and develop alternate and equivalent constructions. Hence, I desire my protection to be limited not by the specific design embodiments described, but only by the proper scope of the appended claims.

I claim:

1. A Salad Dressing Preparation and Storage Container device, wherein the device comprises a divided container having two adjoined compartments in the form of a first and second compartment, the first compartment for oil, and the second compartment for vinegar (acid), wherein said first compartment is volumetrically greater than said second compartment by a ratio established for vinaigrette salad dressing, and wherein said container device is specifically adapted for the mixing of the oil and vinegar (acid) contents to occur for preparing vinaigrette salad dressing, wherein the divided container comprises threads adapted to mate with threads formed in a fluted container lid and the divided container is designed to be sold pre-filled with oil and vinegar and a flexible closure with form fitting plugs, the contents of the salad dressing container compartments configured to be separated by the flexible closure with form fitting plugs adapted to seal the compartments.

2. A device according to claim 1, wherein the ratio of said first compartment to said second compartment is approximately three to one.

3. A device according to claim 1, wherein the container is supplied pre-filled with the oil and vinegar components and includes a compartment sealing means to keep the oil and vinegar separated until they are used by a consumer.

4. A device according to claim 3, wherein a space between the compartment sealing means and a container lid includes a package of additive ingredients to be opened by the consumer and added to the vinaigrette salad dressing prior to mixing.

<p align="center">* * * * *</p>